United States Patent
Lanner et al.

[11] Patent Number: 6,033,707
[45] Date of Patent: *Mar. 7, 2000

[54] FRIED SNACK

[76] Inventors: David Arthur Lanner; David Shang-Jie Chang; Yen-Ping Chin Hsieh, all of The Procter & Gamble Company, Winton Hill Technical Center, 6071 Center Hill Ave., Cincinnati, Ohio 45224

[*] Notice: This patent is subject to a terminal disclaimer.

[21] Appl. No.: 08/964,533

[22] Filed: Nov. 5, 1997

Related U.S. Application Data

[63] Continuation-in-part of application No. 08/943,459, Oct. 3, 1997, which is a continuation of application No. 08/586,047, Jan. 16, 1996, abandoned.

[51] Int. Cl.[7] .................................................. A23L 1/01
[52] U.S. Cl. ...................... 426/445; 426/440; 426/443; 426/446; 426/496; 426/516; 426/808; 426/549; 426/559; 426/656; 426/658; 426/661
[58] Field of Search .................. 426/549, 560, 426/559, 656, 658, 661, 440, 443, 446, 496, 516, 808, 445

[56] References Cited

U.S. PATENT DOCUMENTS

| | | | |
|---|---|---|---|
| 1,142,460 | 1/1915 | Benson. | |
| 3,989,858 | 11/1976 | Williams | 426/552 |
| 4,623,548 | 11/1986 | Willard et al. | 426/559 |
| 4,668,519 | 5/1987 | Dartey et al. | 426/548 |
| 4,678,672 | 7/1987 | Dartey et al. | 426/19 |
| 4,770,891 | 9/1988 | Willard | 426/559 |
| 4,973,481 | 11/1990 | Hunt et al. | 426/144 |
| 5,093,146 | 3/1992 | Calandro et al. | 426/619 |
| 5,104,673 | 4/1992 | Fazzolare et al. | 426/549 |
| 5,340,598 | 8/1994 | Hay, Jr. et al. | 426/496 |
| 5,405,625 | 4/1995 | Biggs | 426/93 |
| 5,458,910 | 10/1995 | Gruetzmacher et al. | 426/611 |
| 5,464,642 | 11/1995 | Villagran et al. | 426/549 X |
| 5,514,387 | 5/1996 | Zimmerman et al. | 426/654 X |

FOREIGN PATENT DOCUMENTS

| | | | |
|---|---|---|---|
| 0 096 305 | 12/1983 | European Pat. Off. | A23L 1/164 |
| 0 287 158 | 10/1988 | European Pat. Off. | A23L 1/164 |
| 94/23591 | 10/1994 | WIPO | A23L 1/217 |
| 95/05090 | 2/1995 | WIPO | A23L 1/217 |

*Primary Examiner*—Milton Cano
*Attorney, Agent, or Firm*—Karen F. Clark; Melody A. Jones

[57] ABSTRACT

A fried snack product which is extruded and shaped into a design. The dough is formed by combining (1) starch-based flour having a specific ratio of gelatinized to ungelatinized starch and an amount of protein, (2) a pregelled modified starch (3) water, (4) shortening or oil, (5) leavening, and (6) an emulsifier. The emulsifier keeps the integrity of the starch structure or dough rheology through the extrusion process.

1 Claim, No Drawings

FRIED SNACK

This is a continuation-in-part of application Ser. No. 08/943,459, filed on Oct. 3, 1997—which is a continuation of application Ser. No. 08/586,047 filed on Jan. 16, 1996 now abandoned.

TECHNICAL FIELD

This application relates to a fried snack product which is extruded and then fried. In particular, this application relates to a process for preparing such products from a dough containing (1) both gelatinized and normal starches, (2) protein, (3) an emulsifier, preferably, selected from the group consisting of diacetyl tartaric acid, monoglyceride mono- and diglyceride, polyglycerol esters and mixtures thereof, (4) a shortening or oil and (5) leavening.

BACKGROUND OF THE INVENTION

A wide variety of starch and protein-based snack food products are presently available to the consumer. Many of these products are in the form of chips, strips, and extruded tubular pieces. Some of these products are expanded or puffed and contain a cellular or honeycombed internal structure.

This invention relates to a fried snack product which is extruded and shaped into a design. The visual features of the design are articulated by the die design, which forms shaped adjacent dough planes when viewed in a cross section.

The shape of the die and the size of the planes presents problems in the development of the dough, shaping and keeping the integrity of the snack as it emerges from the extruder and as it is fried.

It has been discovered that forming a dough from both gelatinized and native starches, a protein-containing flour and an emulsifier provides a snack that has a good texture and taste.

Low moisture levels in the dough can prevent formation of a continuous, smooth extensible dough in the extruder. This can hinder subsequent expansion of the dough pieces during frying, even if the dough can be extruded into the shaped form. It also affects the elasticity of the dough. In addition, low moisture doughs tend to produce a harder and more brittle texture in the resulting snack products. It has been surprisingly found that the low moisture doughs of this invention can be extruded and fried with relative ease and still have a good texture.

It is therefore an object of this invention to make a fried snack which produces a uniform product in a controlled process with desirable texture after frying.

SUMMARY OF THE INVENTION

The present invention relates to an improved novelty shaped fried snack product and a process for it.

This process comprises the steps of:

(a) extruding a mixture comprising:
    (1) from about 35% to about 60% of a source of starch based flour containing from about 6% to about 15% protein, preferably a corn masa, and wherein the ratio of gelatinized to ungelatinized starch is from about 15 to 85 to about 65 to 35;
    (2) from about 2% to about 20% pregelled modified starch;
    (3) from about 0.5% to about 3% of an emulsifier selected from the group consisting of diacetyl tartaric acid, monoglyceride mono- and diglycerides, polyglycerol esters and mixtures therof;
    (4) from about 25% to about 55% added water;
    (5) from about 0.5% to about 5% shortening and/or oil; and
    (6) from about 0.2% to about 5% leavening;
    said extrusion being at a pressure of from about 500 to about 1500 psig and a temperature of from about 70° F. (21° C.) to about 150° F. (65.5° C.);

(b) extruding the dough mixture formed through a shaped orifice consisting of interconnected slit openings of thickness between about 0.02 to about 0.05 inches (0.05 to 0.13 cm) to form a snack piece which is cut to a length of at least ⅛ inch (0.3 cm); and (c) frying said snack pieces.

The snack pieces are fried at a temperature sufficient to form snack products having a light, crispy, crunchy texture, improved flavor and a fat content of from about 20% to about 40%. The water content of the fried snack is less than 3%.

A particularly important aspect of the process of the present invention is the inclusion of an emulsifier in the dough mixture. Most preferred is a blend of diacetyl tartaric acid monoglycerides and polyglycerol esters. The use of emulsifiers at the levels claimed herein keeps the integrity of the starch structure or dough rheology through the extrusion process. The diacetyl tartaric acid monoglycerides in particular provide good texture to the product.

All percentages and proportions are "by weight" unless otherwise specified.

DETAILED DESCRIPTION OF THE INVENTION

A. Dough Formation

A particularly important aspect of the process of the present invention is the dough. This dough is formed from a combination of starch-based flour, water, protein, shortening and emulsifier, most preferably, diacetyl tartaric acid mono- diglyceride fatty acid ester; polyglcerol esters, mono- and diglycerides or mixtures thereof, and a leavening agent. The composition of this dough has two significant effects. One relates to the ability to process the dough in an extruder to provide a shaped dough piece which remains intact when fried to form thin, crisp, shaped snack products. The other relates to the textural and flavor features of the resulting fried snack product. Snack products prepared according to the process of the present invention have a relatively light, crunchy texture. As used herein, the term "crunchy texture" refers to a snack that exhibits a crisp and crunching sensation for the first of several chews.

1. Flour

An important component of this dough is a starch based flour. Corn flour is the most preferred source of starch based flour. Suitable sources of corn flour include ground corn as well as corn masa. Suitable potato flours include, dehydrated potato flakes and granules, mashed potato materials, and dried potato products. Other tuber and grain flours such as tapioca, peanut, wheat, oat, rice, and soy meal can be used in the dough. These starch based flours can be blended to make snacks of different composition and flavor. The preferred starc-based flour is a blend of corn masa selected from the group consisting of white corn masa, yellow corn masa or mixtures thereof.

Suitable starches can be used in combination with the flours noted above. Examples of such materials are potato starch, tapioca starch, corn starch, oat starch, rice starch and wheat starch. Most preferably these starches are cooked so the starch has gelatinized and then are dried and milled to make a flour. The starches can also be chemically modified to alter the hydration and rheological properties of the dough. These starches are called at least partially pregelatinized starches. For example, potato flour is at least 90% pregelatinized starch. Preferred flours contain at least 30% pregelatinized starch.

The flours in the dough contain starches, and pure starches can also be added. The starch present in the flour, no matter from what source, should have a ratio of gelatinized to ungelatinized starch of from about 15 to 85 to about 65 to 35. Some partially gelatinized modified starch may be present. While not intending to be limited by theory, it is believed that the pregelatinized starch, including modified pregelled starches, helps to bind the dough once hydrated enabling formation of the shape during extrusion and provides a cohesive structure in which the leavening and steam can uniformly expand during frying and yield both optimal texture and visual definition of shape.

The protein level of the flour should be about 6% to about 15%. Preferably, a corn masa is used to provide the protein. Usually a mixture of flours such as corn masa, corn flour and modified pregelatinized starches are used to provide the starches and protein. In a preferred dough, from about 35% to about 60% corn masa is used, from about 2% to about 10% corn flour and corn meal, and from about 2% to about 20% pregelatinized modified starch.

In determining the levels of starches and proteins in the flour mixture, all of the starches and proteins in all of flours or added starches are counted.

2. Emulsifier

The emulsifier is selected from the group consisting of polyglycerol monoesters, mono and diglycerides of fatty acids and diacetyl tartaric acid monoglycerides and mixtures thereof. Preferably the emulsifier comprise at least about 70% diacetyl tartaric acid monoglyceride with the balance being selected from the group consisting of polyglcerol esters, mono and diglycerides or mixtures thereof.

Diacetyl Tartaric Acid Monoglyceride

The diacetyl tartaric acid monoglyceride is a fatty acid ester of glycerine which is esterified with diacetyl tartaric acid and a fatty acid having from 12 to about 22 carbon atoms. The fatty acid may be saturated or unsaturated. The Iodine Value of the diacetyl tartaric acid monoglyceride is from about 50 to about 110. Preferably, the IV is from about 70 to about 85. The diacetyl tartaric acid monoglyceride is really a mixture of monoglycerides and diglycerides. A preferred source of these materials is the PANODAN SD and PANODAN 205 K emulsifiers sold by Danisco, Kansas City USA.

Polyglycerol Monoesters

Polyglycerol esters of lower molecular weight are used herein. These are predominantly polyglycerols which are diglycerol or triglycerol entities. Any time glycerine is polymerized a mixture of polyglycerols are formed. Most preferred for use in this invention is a diglycerol monoester which is a mixture of monoesters of polyglycerol which is predominantly a diglycerol. The preferred fatty acids used to made the esters are saturated and unsaturated fatty acids having from 12 to 22 carbon atoms. The most preferred diglycerol monoester is diglycerol monopalmitate.

Mono and Diglycerides

Mono and diglycerides saturated and unsaturated fatty acids having from 12 to 22 carbon atoms can also be used herein.

3. Water

Another important characteristic of the dough of the present invention is its water content. As used herein, the term "added" refers to water which has been added to the dry dough ingredients. Water which is inherently present in the dry dough ingredients, such as in the case of the sources of flour and starches, is not included in the added water. The level of water in flours and starches is usually from about 3% to about 12%.

The doughs of the present invention can comprise from about 25% to about 55% added water. Preferably, these doughs comprise from about 35% to about 45% added water.

This low level of water in the dough along with the addition of emulsifier to the doughs provides doughs which can form cohesive shapes.

4. Leavening

The dough also contains from about 0.20 to about 5% leavening. Any conventional leavening can be used. Highly preferred leavenings include alkali metal carbonates and hydrogen carbonates, e.g. sodium bicarbonate, sodium or potassium carbonate, and calcium carbonate. Other leavening agents such as sodium aluminum phosphate can be used, but are not as preferred.

Preferably, the leavening should be of a larger particle size or encapsulated to prevent it from evolving gas in the extruder, and thus expanding the product before frying. Preferably a particle size of from about 0.0035 inches (0.088 mm) to about 0.0098 inches (0.250 mm) is used.

The leavening can also be encapsulated in a low melting fat or shortening so that it is released at the fry temperatures.

5. Modified Starch

The dough mixture also contains from about 2% to about 20% of a pregelled modified starch. This starch helps to develop the dough strength and provides a firm definition to the dough and helps to control the expansion of the dough during frying.

The preferred pregelled modified starch is a modified waxy starch.

6. Shortening

The dough also contains a liquid oil, shortening or solid fat, preferably a shortening is used. A shortening contains both liquid and solid fats. Usually from about 80% to 95% of a liquid oil is used and from about 5% to about 20% of a solid fat is used. The preferred sources of the oil and fat are vegetable oils such as partially hydrogenated canola oil, corn oil, soybean oil or cottonseed oil. Animal fats or marine oils may also be used. The preferred shortenings are beta prime shortenings.

Both nondigestible and digestible fats can be used. Nondigestible fats such as polyol polyesters, and reduced calorie fats such as those made with long chain and medium or short chain fatty acids can also be used. See for example, U.S. Pat. No. 4,005,195 and U.S. Pat. No. 4,005,196 issued to Jandacek et al.; U.S. Pat. No. 4,832,975 issued to Yang, U.S. Pat. No. 4,582,715 issued to Volpenhein, U.S. Pat. No. 5,419,925 issued to Seiden et al., U.S. Pat. No. 5,288,512 issued to Seiden; U.S. Pat. No. 5,422,131 issued to Elsen et al., and U.S. Pat. No. 4,861,613 issued to White.

pH

The pH of the dough needs to be between about 5 and 8. This controls the release of the leavening and affects the flavor and texture.

Other Ingredients

Salt, flavorings, and/or seasonings can also be optionally included in the dough or sprinkled on the surface of the snack after frying.

Vitamins and minerals can also be added to improve the nutritional value of the extruded snacks. These vitamins and minerals can be added to the dough or added with the seasonings after frying.

B. Extrusion

The snack pieces are formed in an extruder. A single or twin screw extruder can be used. A preferred extruder is a pasta forming extruder which uses a single screw and a die which shapes the dough formed in the extruder. The extruder is operated at a pressure of from about 500 psig to about 1500 psig and a temperature of from 70° F. (21° C.) to about 150° F. (65.5° C.) at a rotational speed of from about 15 rpm to about 40 rpm.

The snack pieces can be formed into a variety of shapes by adjusting the shape of the extruder orifice. The orifice has an opening dimension of from about 0.05 cm to about 0.13 cm. Various shapes can be used. These include, but are not limited to, stars, faces, bow ties, circles, concentric shapes and circles, jack-o-lantern designs.

The dry ingredients are preferably prescreened through a sieve with a smaller dimension than the die orifice to prevent blockage in the die of the extruder.

The dough can be prepared by any suitable method for combining together the previously described ingredients and adding them to the extruder. Preferred devices for mixing together these dough ingredients are conventional mixers. Hobart® mixers are used for batch operations and Turbolizer® mixers or mixers that are typically integral components of pasta extruders can be used for continuous mixing operations. The premixing of the dough ingredients can be used to improve the uniformity of hydration in the dough.

The emulsifier is added to the shortening and fed into the mixer. The flour, leavening and modified starch are fed into the mixer as a separate dry mix stream. Water is also added as a separate stream. It is important that the three feed streams—shortening, water and dry ingredients, be a steady feed. Although the ingredients hydrate during mixing, a cohesive dough is formed within the extruder.

The extruded shape emerges from the extruder through the die orifice and is cut into snack pieces at least ⅛ inch in length, and preferable from about ⅛ inches (0.3 cm) to ½ inches (1.25 cm) in length.

C. Frying

The snack pieces are fried. Preferably the snacks are prepared by a continuous frying method. The shaped pieces are passed through the frying medium until they are fried to a crisp state with a final moisture content of less than 3%, preferably about 0.5% to 2.5% water.

Continuous frying or batch frying of the snack pieces is also acceptable. In this method the pieces are immersed in the oil beneath a moving belt.

If desired, the snack pieces can be fried and then heated with hot air, superheated steam or inert gas to lower the moisture 3% or less. This is a combined frying/baking step.

Typical frying medium include fats and oils derived from animal and vegetable sources. Any hydrogenated or unhydrogenated fat can be used. These include corn oil, soybean oil, palm oil, cottonseed oil, canola oil, rapeseed oil, sunflower seed oil, lard, tallow, peanut oil, among others. Synthetic triglycerides can also be used, including low calorie or zero calorie fats, e.g. polyol polyesters of fatty acids such as sucrose polyesters, etc. The snack pieces are fried at temperatures between about 300° F. (148° C.) and 450° F. (232° C.). The exact fry time is controlled by the temperature of the oil and the starting water content. The fry time and temperature is easily determined by one skilled in the art.

The snack products made from this process typically have from about 20% to about 40% fat. Preferably, the fried snacks will have from about 23% to about 35% fat content.

SPECIFIC EXAMPLES OF PROCESS OF PRESENT INVENTION

The process of the present invention is illustrated by the following specific examples:

| Ingredient | Wet Dough Percentage |
| --- | --- |
| White Maseca | 24.02% |
| Yellow Maseca | 24.02% |
| Maltrin 100 | 2.54% |
| Instant Clearjel | 9.84% |
| Flour Salt | 0.89% |
| Sucrose | 1.27% |
| Onion Powder | 0.47% |
| Baking Soda, fine | 0.35% |
| Shortening | 0.80% |
| PANODAN SDK | 0.56% |
| PGE | 0.24% |
| Tap Water | 35.00% |

The dry ingredients are mixed and prescreened through a #25 sieve (particle size less than 0.707 mm). These are added to a high pressure pasta extruder (Demaco, Ridgewood, N.J.) at a rate of 455 lbs/hour. The emulsifier is mixed with the shortening in liquid form. The emulsifier/shortening blend is fed into the extruder as a separate stream at 5.89 lbs/hour. Water is added as a third stream at 245.3 lbs./hour.

The pressure is not measured and the temperature in the extruder is about 90° F. (32.2° C.).

The product exits through a die shaped like a face and is cut into pieces about 1 centimeter in length.

This product is fried in cottonseed oil at a temperature of 350° F. (176.7° C.) for 45 seconds. The product is then seasoned with salt.

What is claimed is:

1. Fried snack pieces made from a dough composition comprising:

(1) from about 35% to about 60% of a source of starch based flour containing from about 6% to about 15% protein and wherein the ratio of gelatinized to ungelatinized starch is from about 15 to 85 to about 65 to 35;

(2) from about 2% to about 20% pregelled modified starch;

(3) from about 0.5% to about 3% emulsifier, wherein said emulsifier comprises: (a) about 70% diacetyl tartaric acid monoglyceride, and (b) about 30% polyglycerol monoester;

(4) from about 25% to about 55% added water;

(5) from about 0.5% to about 5% shortening or oil; and (6) from about 0.2% to about 5% leavening.

\* \* \* \* \*

UNITED STATES PATENT AND TRADEMARK OFFICE
CERTIFICATE OF CORRECTION

PATENT NO.    :    6,033,707
DATED         :    March 7, 2000
INVENTOR(S)   :    David Arthur Lanner, et. al.

It is certified that error appears in the above-identified patent and that said Letters Patent is hereby corrected as shown below:

Cover page of the issued patent, under References Cited, delete: "1,142,460 1/1915 Benson".

Cover page of the issued patent, under Foreign Patent Documents, insert: -- 1,142,460 1/1915 Benson Great Britain --.

Signed and Sealed this

Third Day of April, 2001

*Attest:*

NICHOLAS P. GODICI

*Attesting Officer*    *Acting Director of the United States Patent and Trademark Office*